US011468112B2

(12) United States Patent
Bazzi et al.

(10) Patent No.: US 11,468,112 B2
(45) Date of Patent: *Oct. 11, 2022

(54) SYSTEMS AND METHODS FOR IMAGE MATCHING AND RETRIEVAL PROCESS

(71) Applicant: Arizona Board of Regents on Behalf of Arizona State University, Tempe, AZ (US)

(72) Inventors: Rida Bazzi, Scottsdale, AZ (US); Garrett Decker, Chandler, AZ (US); Eric Aboussouan, Campbell (CA)

(73) Assignees: Arizona Board of Regents on Behalf of Arizona State University, Tempe, AZ (US); Google, Inc., Mountain View, CA (US)

( * ) Notice: Subject to any disclaimer, the term of this patent is extended or adjusted under 35 U.S.C. 154(b) by 332 days.

This patent is subject to a terminal disclaimer.

(21) Appl. No.: 16/591,331

(22) Filed: Oct. 2, 2019

(65) Prior Publication Data

US 2020/0104317 A1    Apr. 2, 2020

Related U.S. Application Data

(60) Provisional application No. 62/740,357, filed on Oct. 2, 2018.

(51) Int. Cl.
*G06F 16/583* (2019.01)
*G06F 16/55* (2019.01)
*G06F 16/14* (2019.01)
*G06K 9/62* (2022.01)

(52) U.S. Cl.
CPC ........ *G06F 16/5854* (2019.01); *G06F 16/152* (2019.01); *G06F 16/55* (2019.01); *G06K 9/6276* (2013.01)

(58) Field of Classification Search
CPC ...... G06K 9/6201–6215; G06K 9/4671–4676; G06K 9/00483; G06F 16/5854; G06F 16/583–5838
See application file for complete search history.

(56) References Cited

U.S. PATENT DOCUMENTS

| 6,031,935 A | * | 2/2000 | Kimmel | G06K 9/48 382/170 |
| 2009/0310830 A1 | * | 12/2009 | Bolle | H04L 9/0866 382/124 |
| 2019/0220693 A1 | | 7/2019 | Bazzi | |

OTHER PUBLICATIONS

Liang, Xuefeng, Arijit Bishnu, and Tetsuo Asano. "A robust fingerprint indexing scheme using minutia neighborhood structure and low-order delaunay triangles." IEEE Transactions on Information Forensics and Security 2.4 (2007): 721-733. (Year: 2007).*
Bozas, Konstantinos, and Ebroul Izquierdo. "Large scale sketch based image retrieval using patch hashing." International symposium on visual computing. Springer, Berlin, Heidelberg, 2012. (Year: 2012).*
Huang, Xi, et al. "A robust image hashing with enhanced randomness by using random walk on zigzag blocking." 2016 IEEE Trustcom/BigDataSE/ISPA. IEEE, 2016. (Year: 2016).*

* cited by examiner

*Primary Examiner* — Vincent Rudolph
*Assistant Examiner* — Raphael Schwartz
(74) *Attorney, Agent, or Firm* — Polsinelli PC

(57) ABSTRACT

Various embodiments of systems and methods for image matching and retrieval process are disclosed.

7 Claims, 23 Drawing Sheets
(19 of 23 Drawing Sheet(s) Filed in Color)

Divide stored document into grid cells

FIG. 4A

Rare points
(uncommon features)
chosen in each cell

FIG. 4D

Different Types of Triangles

40 Small Triangles (closest neighbors)

SYSTEMS AND METHODS FOR IMAGE MATCHING AND RETRIEVAL PROCESS

CROSS REFERENCE TO RELATED APPLICATIONS

This is a non-provisional application that claims benefit to U.S. Provisional Application Ser. No. 62/740,357; filed on Oct. 2, 2018, which is herein incorporated by reference in its entirety.

FIELD

The present disclosure generally relates to image matching, and in particular to systems and methods for image matching and retrieval process.

BACKGROUND

Image matching involves a process by which similarities between images or portions of an image are identified. Similarities between different images may range from the case where the images are exact copies of one another, to the case where images share the same or similar content. Matching algorithms have applications in document image retrieval, de-duplications (detecting multiple copies of the same image), detecting copyright violations (copyrighted image is copied and manipulated in some form), visual querying (looking up images that are similar to a given image), or image stitching (constructing a composite image in which two images that overlap to some extent are seamlessly stitched together). Image matching is typically achieved by calculating local features of the images and identifying points that have interesting local features. Once those points' features are identified, points in the two images with similar features can be corresponding points. Determining which points in one image correspond to points in the other image can be done using random sampling (RANSAC) under the assumption of a model of how parts of one image are mapped to parts of another image. In addition, features such as the Scale Invariant Feature Transform (SIFT), Oriented FAST and rotated BRIEF (ORB), speeded up robust features (SURF) or other features can be used to determine which points in one image correspond to points in the other image.

Document image retrieval is concerned with finding a document in a database or collection of documents that matches some given keywords or a view (partial or complete) of the document. This can be done with the help of Optical Character Recognition (OCR) or without OCR by extracting features of words or lines of text of the query image against features of words or lines of the document database. However, many of these existing works are dependent on local point features.

It is with these observations in mind, among others, that various aspects of the present disclosure were conceived and developed.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

Figure 4A:
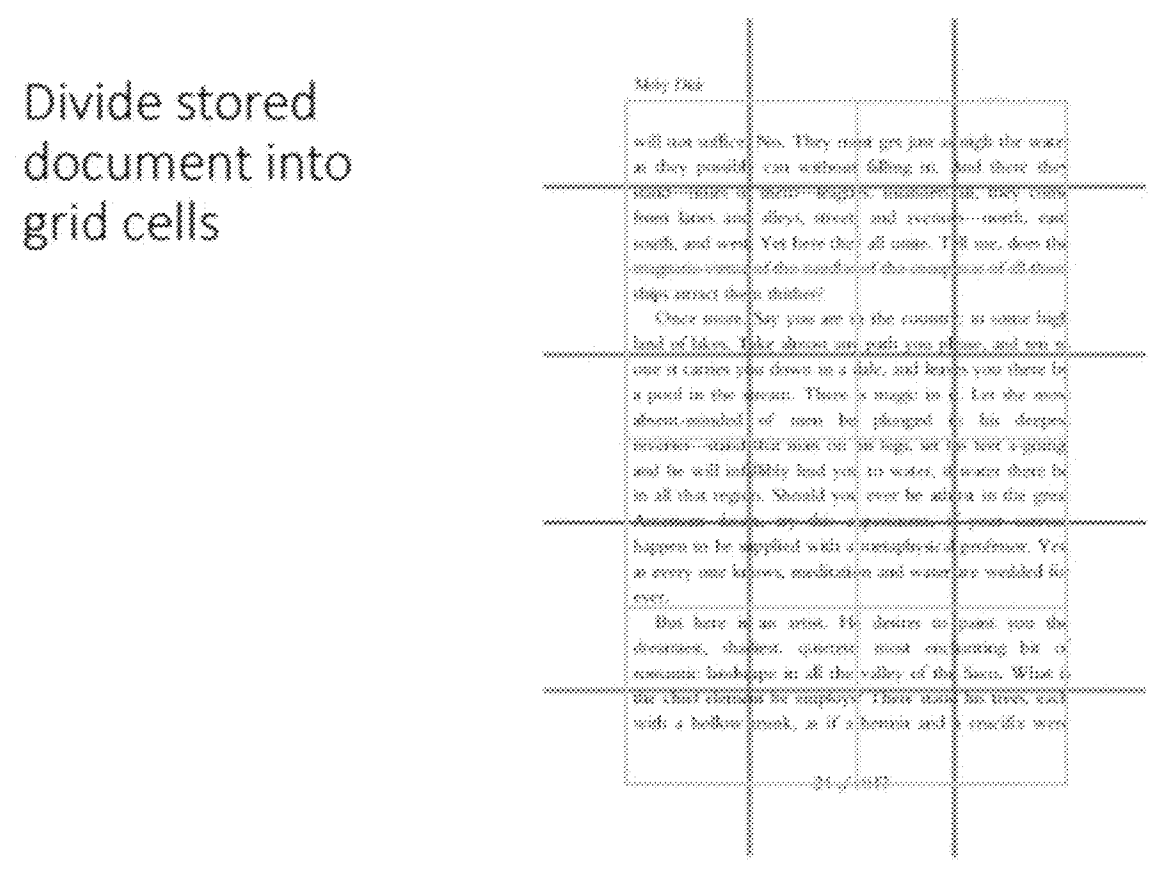
Figure 4D:
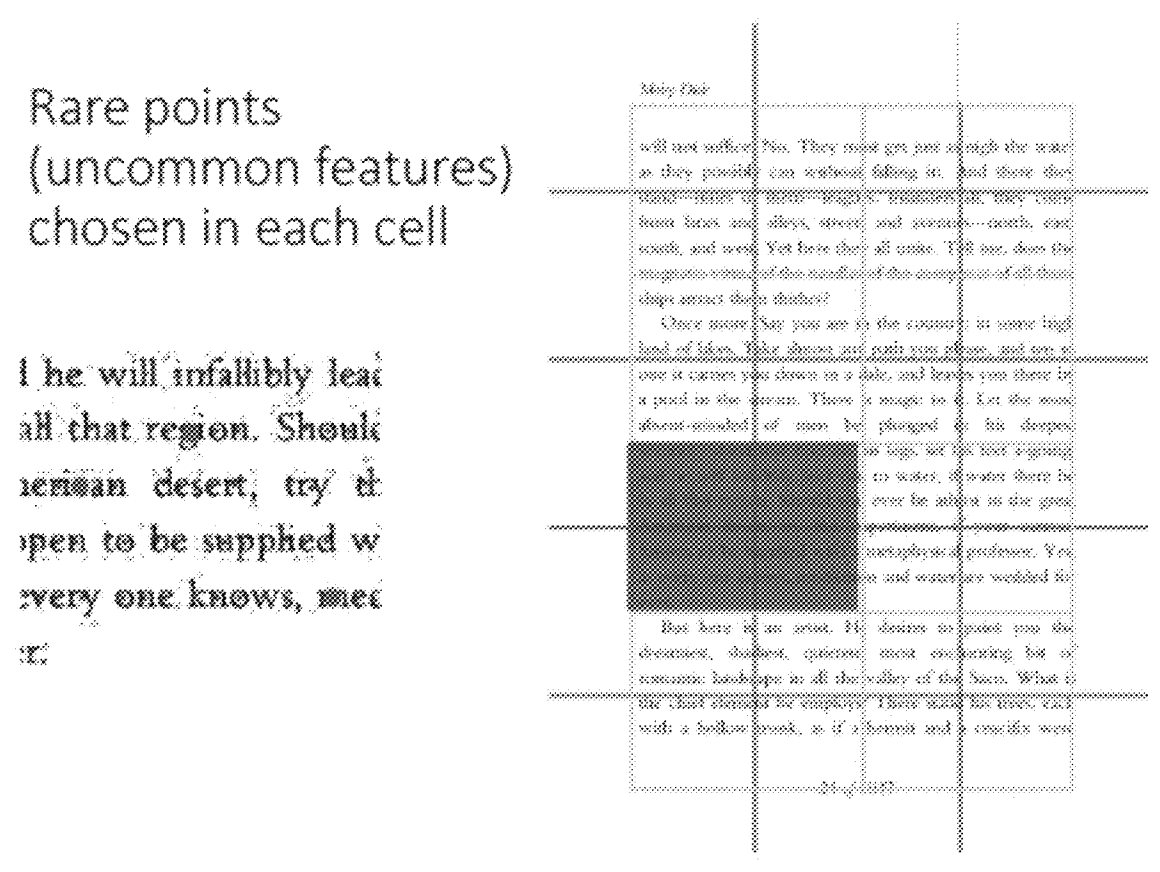

FIGS. 4A-4G are images demonstrating steps for dividing images into a grid of cells to extract features from certain cells of interest.

Corresponding reference characters indicate corresponding elements among the view of the drawings. The headings used in the figures do not limit the scope of the claims.

DETAILED DESCRIPTION

Systems and methods for image retrieval that involves the rapid retrieval of a particular image from an image database; or image matching, are disclosed herein. The images may be composed of pictures, handwriting and/or printed text and may be preprocessed by an image retrieval system. In addition, in some embodiments, a processor executes instructions for quickly retrieving a complete image that corresponds to the partial view if found in the image database. In some embodiments, the result of the retrieval can be one unique image that matches the partial view or a small number of potential candidate matches that may be a match with the partial view of the image being searched.

In one aspect, each image and view of the image database is converted by the processor into a collection of features with the following desirable properties:
 1. Stable. The same feature should be detected for the image and for a random overlapping view.
 2. Discriminative. There should be relatively few instances where two matching features do not come from the same spot on the same image or view.
 3. Space Efficient. A small number of features should be capable of representing the partial view or image. This will lead to a low amount of feature comparisons, and by extension, a fast algorithm running time.

Features that possess these properties are referred to herein as a rare feature. Rare features are not calculated for the whole image at once. In one method, the image is divided into a grid of image cells and rare features are calculated for each cell of the image. Once rare features are pre-calculated for all images in the image database, the rare features are organized in a table that allows fast checking (sorting or hash table for example). Every rare feature in the table also contains information on the image cell(s) from which it originated. Note that the size of a cell can be parameterized depending on the setting. In one embodiment, each cell would have a size based on the expected size of partial view image queries. In one method, each cell of a complete image is treated as a smaller image, and processor computes the number of matching features between a query image and each cell. In one aspect, this can be advantageous because it is expected that the partial image query to have many matches to the correct complete image in a dense area.

For the view image, the rare features need to be calculated at the time the view is processed by the algorithm by the processor. In one step, every rare feature of the view image is checked for inclusion in the table of features. The images in the image database that have the largest number of matches with the view image are returned as candidates (we might require that the number of matches should be for matches originating from the same image cell). In general, the number of returned candidates can be parameterized depending on the setting.

Figure 1:
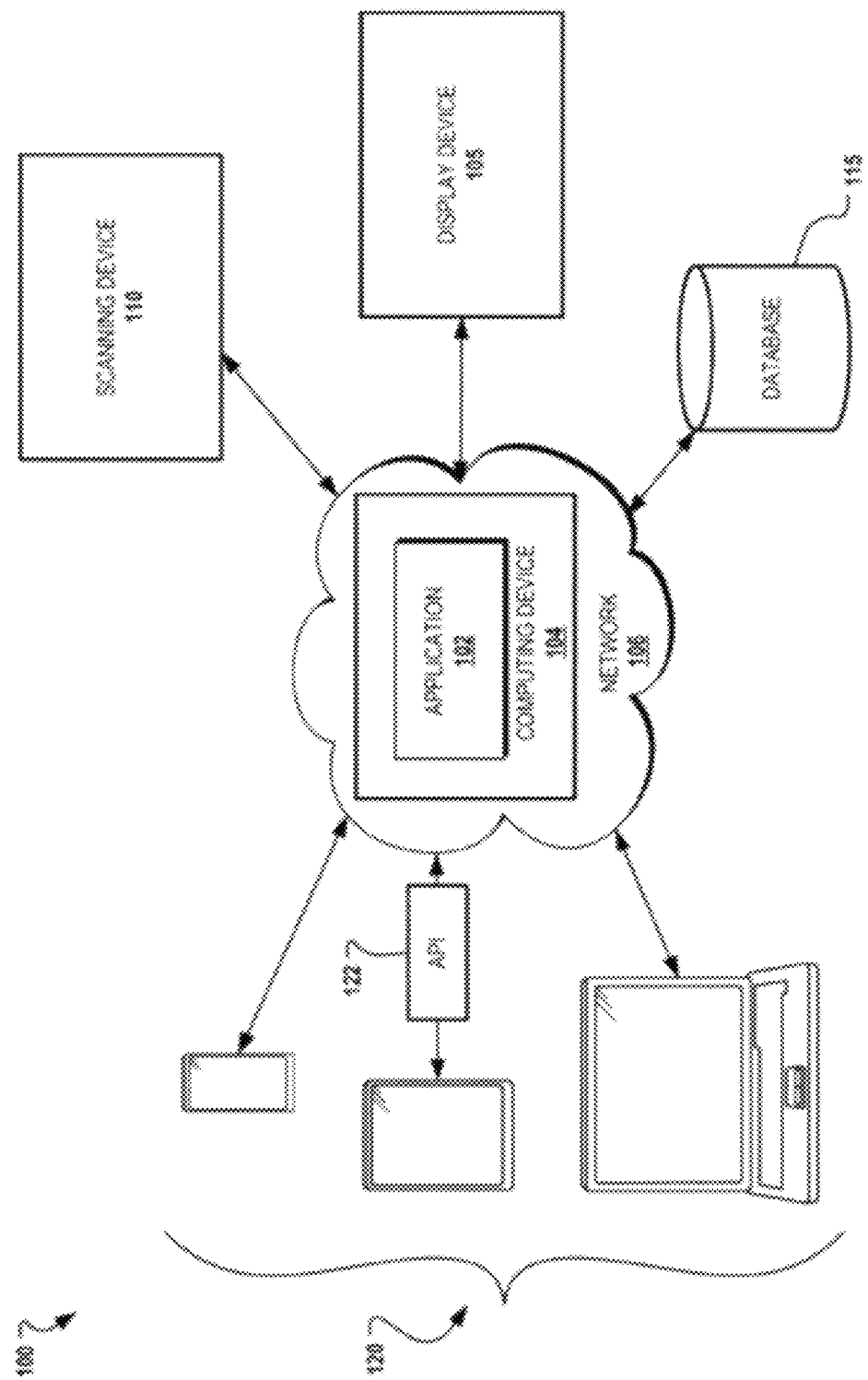
FIG. 1 is a simplified block diagram of a possible computer-implemented system for implementing the image matching functionality described herein.

Referring to FIG. 1, an exemplary computer-implemented system (hereinafter "system") 100 for implementing functionality associated with image retrieval and matching is shown. The system 100 may include and/or generally support functionality defined by an application 102 that configures one or more processors or computing devices to execute the image matching functionality described herein. The application 102 may be hosted on one or more of a computing device 104, which may include a server, controller, a personal computer, a terminal, a workstation, a portable computer, a mobile device, a tablet, a mainframe, or other such computing device. Further, aspects of the application 102 associated with image processing/matching may be outputted to a display device 105 as described herein. In general, the application 102 may be programmed to execute the algorithm or functionality defined by FIG. 2 and its associated details set forth herein.

The computing device 104 may be configured for administering and providing functionality of the application 102 via a network 106, which may include the Internet, an intranet, a virtual private network (VPN), and the like. In some embodiments, a cloud (not shown) may be implemented to execute one or more components of the system 100. In addition, aspects of the system 100 and/or the application 102 may be implemented using platform as a service (PaaS), and/or software as a service (SaaS) using e.g., Amazon Web Services, or other distributed systems.

In some embodiments, the computing device 104 may be in operable communication (by wired connection or wirelessly connected) with at least one of a scanning device 110. The scanning device 110 may be a high-speed scanner, camera, or other such device configured to capture images for access by the computing device 104. The scanning device 110 may be configured with any number of hardware or software features to accommodate the production of digital images for analysis by the computing device 104. In some embodiments, the scanning device 110 may include any device equipped with a camera or other image capture technology and capable of generating image data or digital images.

In addition, the computing device 104 may store images, and/or data and/or metadata regarding the images and image processing derived from the application 102 in a database 115. In addition, the database 115 may store metadata associated with operations of the application 102, such a queries, and historical data. The database 115 may further store and retrieve image data requested by the application 102, and store information about users of the application 102.

Further, at least some features of the application 102 may be made available to a plurality of user devices 120 in communication with the computing device 104 of the system 100 via the network 106. The plurality of user devices 120 may include, without limitation, a controller, a personal computer, a terminal, a workstation, a portable computer, a mobile device, a tablet, a phone, a pager, and a multimedia console. The plurality of user devices 120 may be accessible to or associated with administrators, technicians, or other such users. In some embodiments, any one or more of the user devices 120 may utilize or access an application programming interface (API) 122 associated with the application 102 to access functionality related to the application 102 as desired.

Details of Approach

Figure 2:
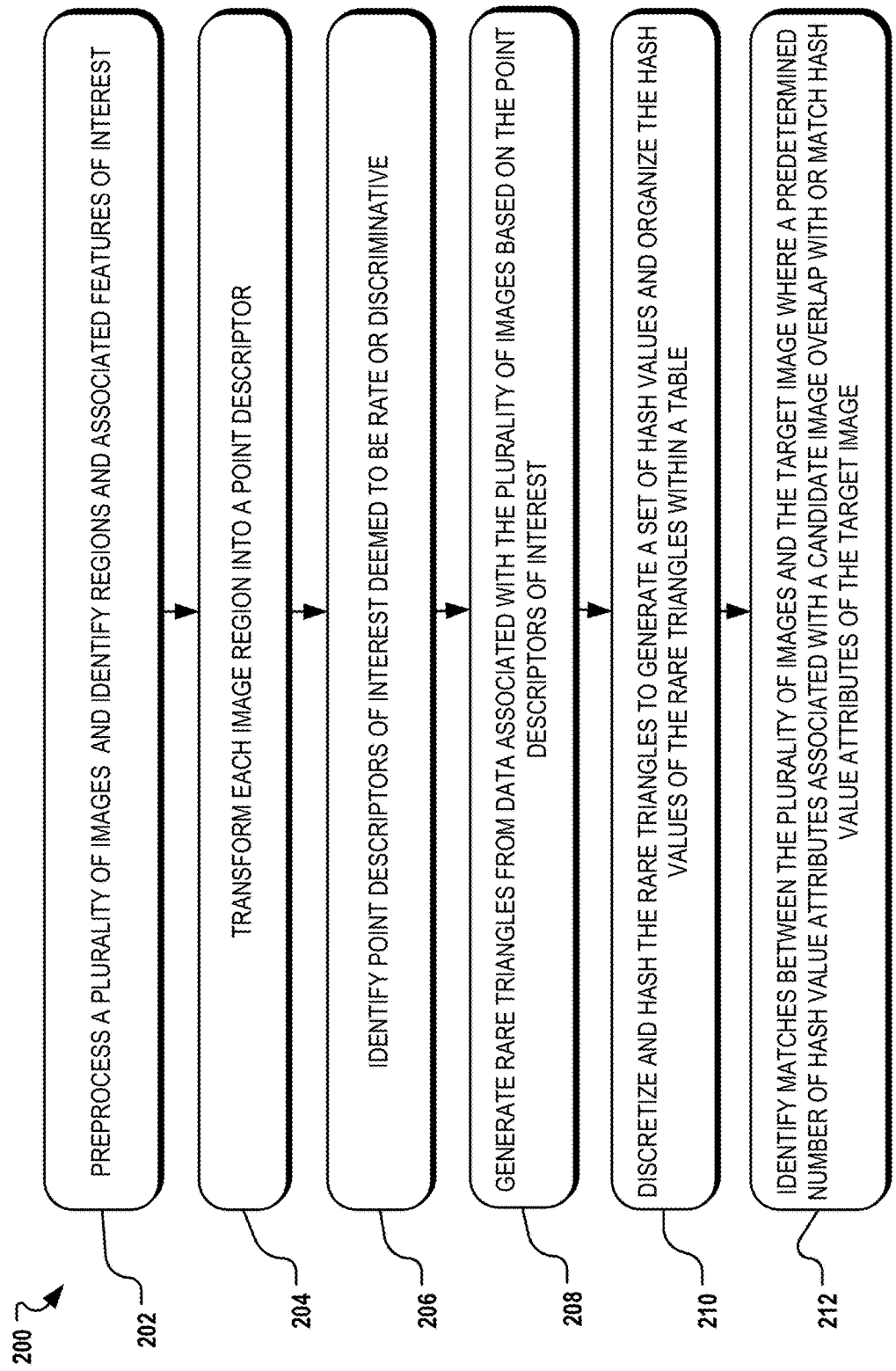
FIG. 2 is a simplified block diagram illustrating a process flow for matching images, according to aspects of the present disclosure.

Further details of one approach for image matching and retrieval shall now be described with reference to a process flow 200 of FIG. 2. In general, the functionality described may involve image analysis of a plurality of images (of, e.g., a database 115) for a potential match with a target or query image, and accommodates fast retrieval of candidate images from the plurality of images. It should be understood that the functionality described may be applied to both to the plurality of images and also to a target or query image to break down all of the images to a form which is more efficient for comparison.

Identify Image Regions and Transform Regions to Point Descriptors

Referring to block 202, a plurality of images (or a sole image), and a query or target image, may be segmented into a plurality of regions. In general, an image region can be defined based on a number of criteria (color, intensity, connectTranedness, saliency, or other criteria). In some embodiments, the plurality of images and the target/query image may be binarized to transform each image from color or grey scale to black and white. In some embodiments, this binarization step may be optional and the matching and features described herein may be calculated directly from the grey scale or color images without binarization.

Referring to block 204, after image regions are identified, each region is transformed into a point descriptor. In general, there can be many ways to transform a region into a point descriptor. The point descriptor consists of a point in the coordinate system of a given image of the plurality of images, plus a descriptor of the region corresponding to the point descriptor. The descriptor in general can include any number of features of the regions (color, moments, and the number of pixels, average radius, and elongation for example). It was discovered that for the cases considered that the centroid of the region together with number of pixels and the average radius is an effective point descriptor. It is contemplated that one could weigh the pixels for saliency according to some saliency measure. It is further contemplated that one could also consider shape descriptors as additional descriptors for the content of an image region.

Discriminative Descriptors

Referring to block 206 (and demonstrated in FIGS. 4A-4G, 5A-5C, and 6A-6D) certain point descriptors of interest may be identified. In general, the plurality of images are divided into overlapping cells of a grid; and for each cell, rare triangles are determined (based on the point descriptors and regions), discretized, and added to a database hash table. In particular, a descriptor may be deemed discriminative if it is not common in the image (or more generally not common in the image database or other representative training databases). In one embodiment, to determine discriminative descriptors, one can collect statistics of the descriptors of the image and choose descriptors that are not common and that are less likely to be affected, by dividing the image into a grid. For example, very large regions might be discriminative, but are more likely to be divided into smaller regions in the view image or the image cells, so one might opt to choose less discriminative and somewhat smaller regions because they are more likely to stay intact in the view image and the image cells. It should be noted herein that whether or not a descriptor is discriminative is not necessarily calculated for a specific value of the descriptor but possibly for ranges of values. For example, a particular value might not be common, but values close to it might be common. To allow for a margin of error, such a descriptor would not be considered rare.

Rare Triangles

Referring to block 208, geometric constructs, such as triangles, may be identified that correspond with point descriptors of the plurality of images. Rare triangles are a special case of the more general rare polygons. A rare polygon consists of a rare vertex together with a number of nearest neighbors. A type $(i_1, i_2, i_3, \ldots, i_m)$ rare polygon consists of a rare point and its $i_1^{th}, i_2^{th}, i_3^{th}, \ldots,$ and $i_m^{th}$ nearest neighbors. Using rare polygons approach can drastically increase the discrimination of an already fairly discriminative feature (the triangle). However, if the point descriptors of a rare polygon are not stable, then there are drawbacks to increasing the number of point descriptors. If a point descriptor in a partial view of an image is missed for whatever reason, then any feature in the complete image containing that point descriptor will have a near zero chance of matching to any features in the partial view. An appropriate number of vertices can be determined to balance stability with discrimination.

A triangle consists of three point descriptors and the corresponding edges. Rare triangles are selected by first selecting one vertex, which is a rare point descriptor. To ensure stability across views and image cells, the $2^{nd}$ and $3^{rd}$ vertices need to be chosen so that if the $1^{st}$ vertex appears in two views, then choosing the $2^{nd}$ and $3^{rd}$ vertices in the two views will likely yield the same results. This might rule out choosing a rare triangle consisting of, say, the three rarest point descriptors in the view. In one embodiment, the $2^{nd}$ and $3^{rd}$ vertices are chosen to be nearest neighbors of the $1^{st}$ vertex. For example, the $2^{nd}$ vertex can be the $i^{th}$ nearest neighbor of the $1^{st}$ vertex and the $3^{rd}$ vertex can be the $j^{th}$ nearest neighbor of the $1^{st}$ vertex amongst all vertices in the view. If the first vertex is far enough from the edge of the view, the $2^{nd}$ and $3^{rd}$ vertices will be the same across views. Note that the $2^{nd}$ and $3^{rd}$ vertices are not necessarily rare. In practice, it was found that choosing one vertex to be rare is sufficient for discrimination. In some embodiments, the $i^{th}$ and $j^{th}$ nearest neighbors could also be chosen such that the edge lengths are rare.

Note that two values of i and j define a triangle type. A triangle type (i,j) consists of a $2^{nd}$ vertex which is the $i^{th}$ nearest neighbor of the $1^{st}$ vertex, and a $3^{rd}$ vertex which is the $j^{th}$ nearest neighbor of the $1^{st}$ vertex. For the same $1^{st}$ vertex, multiple triangles for various values of i and j can be considered. When the present method compares whether two triangles match, only triangles of the same type are considered. For example, if one triangle in one view is of type (2,4) the present method only compares it against triangles of type (2,4) in the image cells.

Although by the present method it is desired to keep the number of features relatively low, it is sometimes constrained by a low number of features in the image. Generating many different types of triangles is an efficient way to boost the number of features if needed.

Figure 3:
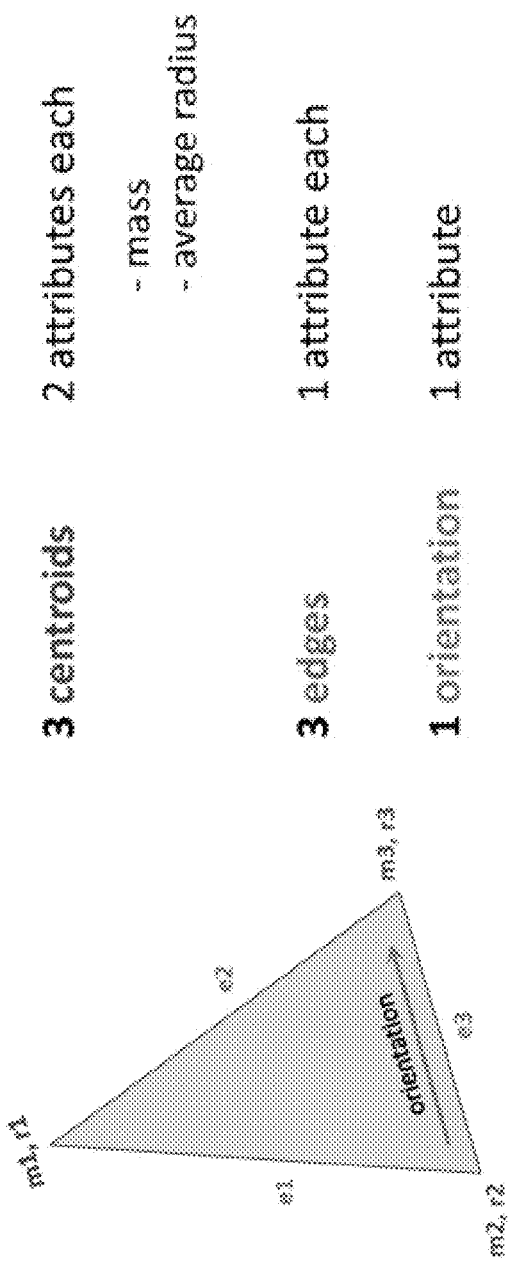
FIG. 3 is an image of a triangle generated from point descriptors of an image having a number of attributes which may be used to define an overall hash value associated with the triangle.
Figure 4B:
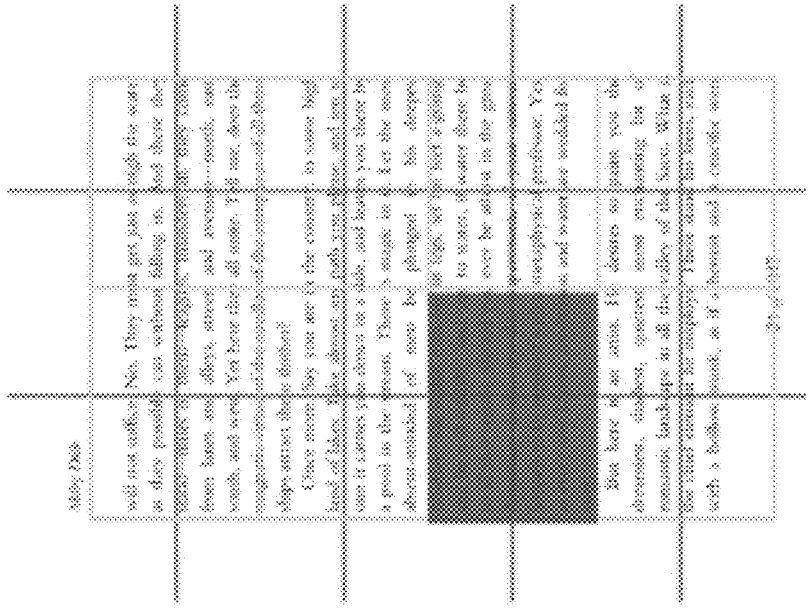
Figure 4C:
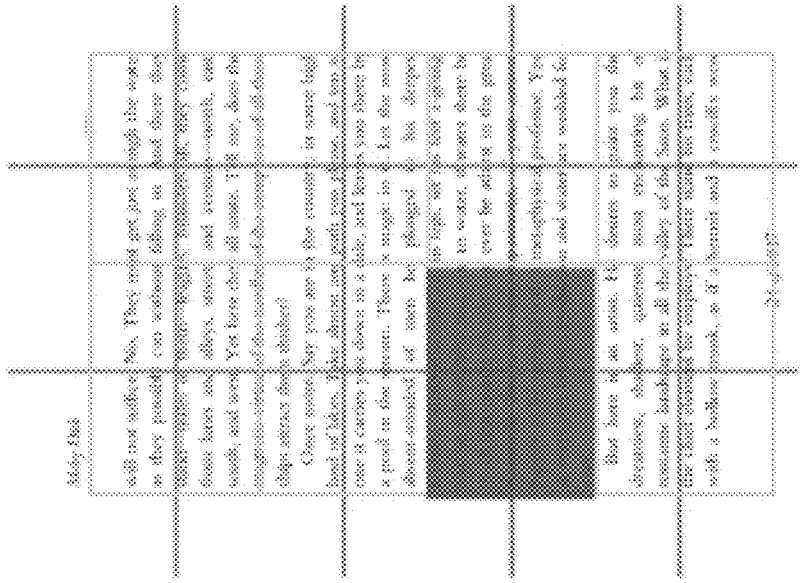
Figure 4E:
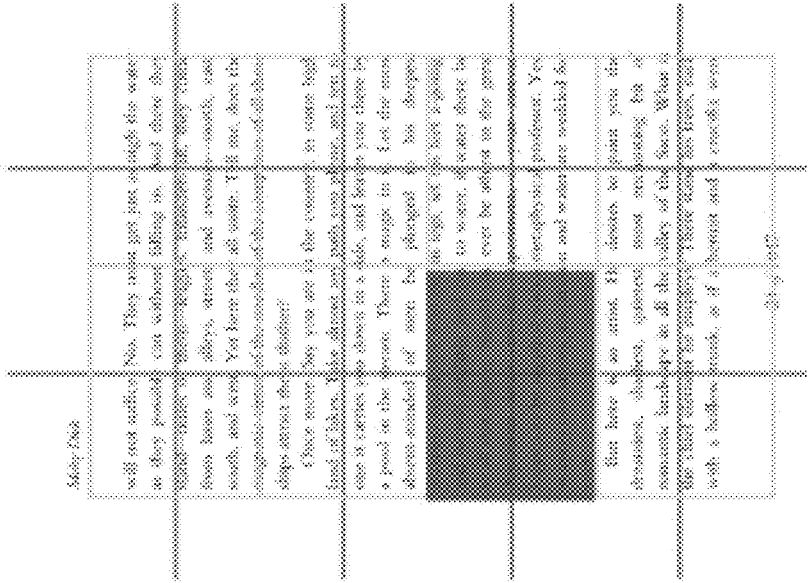
Figure 4F:
Figure 4G:
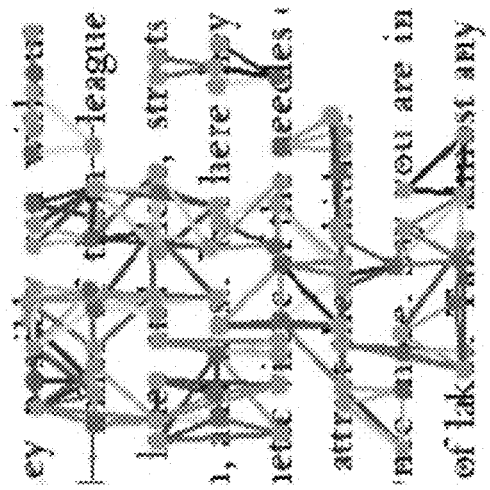
Figure 5A:
FIGS. 5A-5C are images illustrating different types of image data that may be divided into a grid of cells to extract features from certain cells of interest.
Figure 5B:
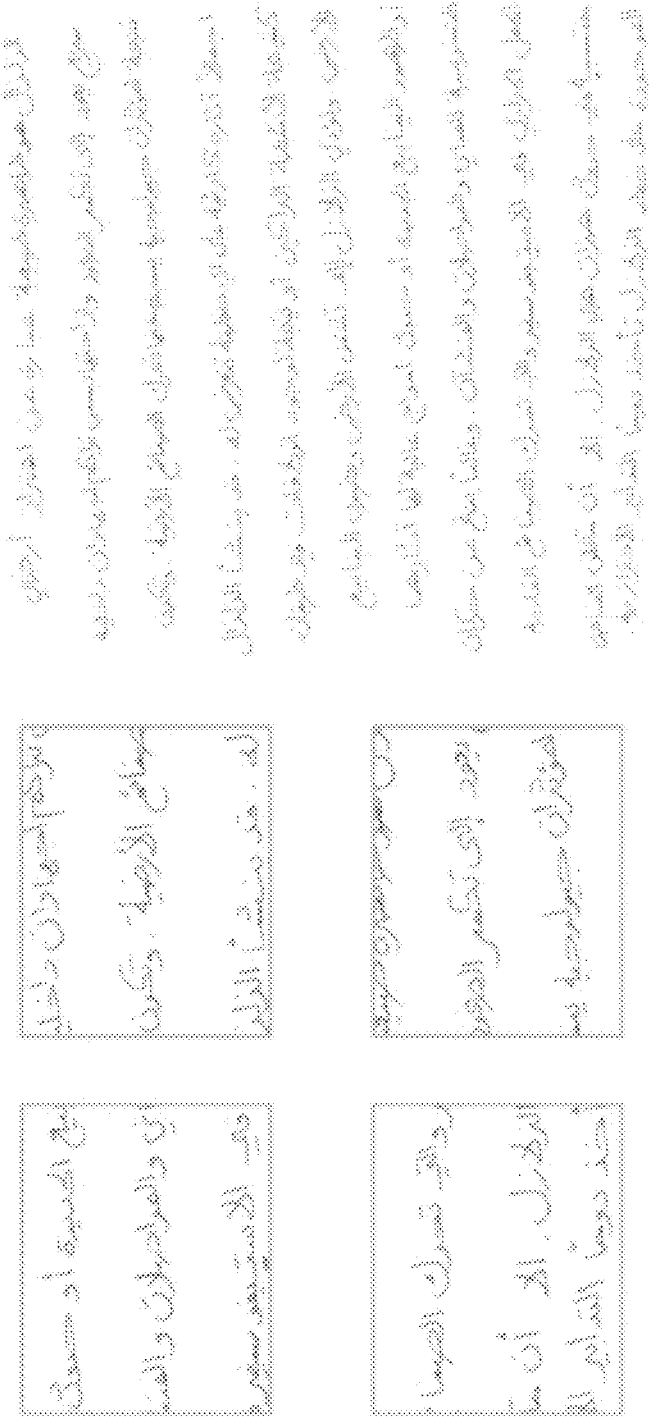
Figure 5C:
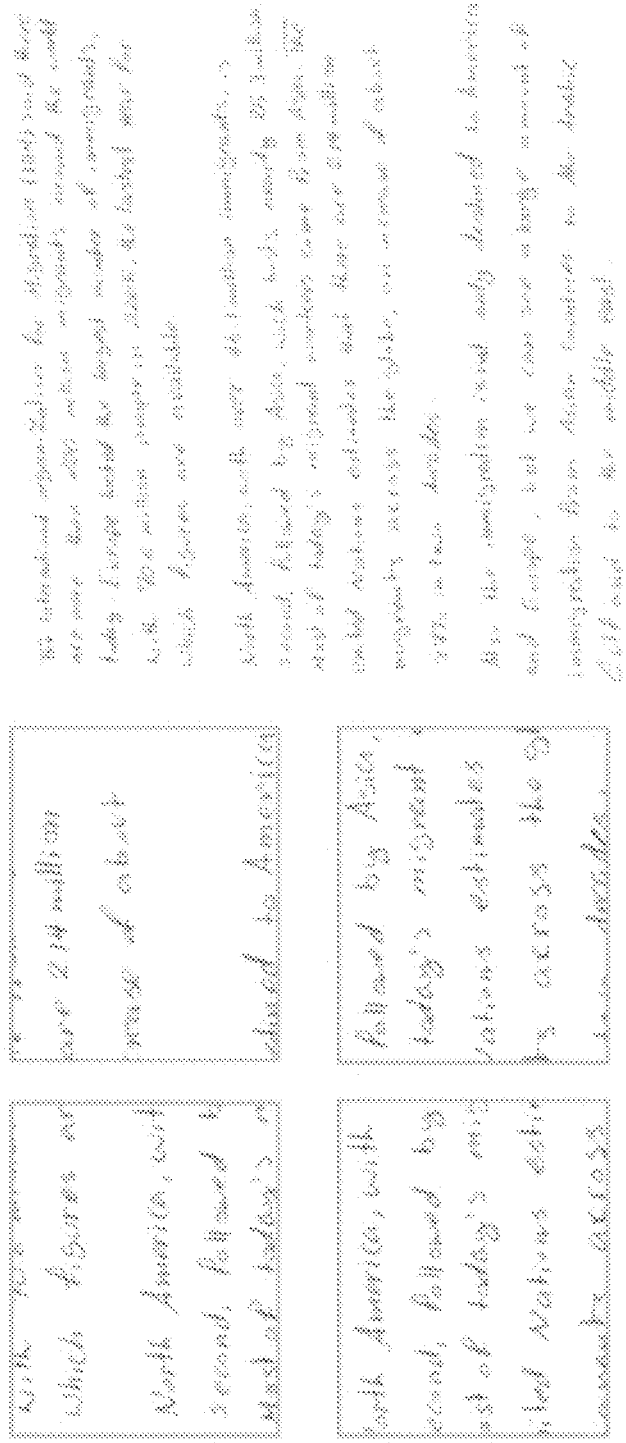
Figure 6A:
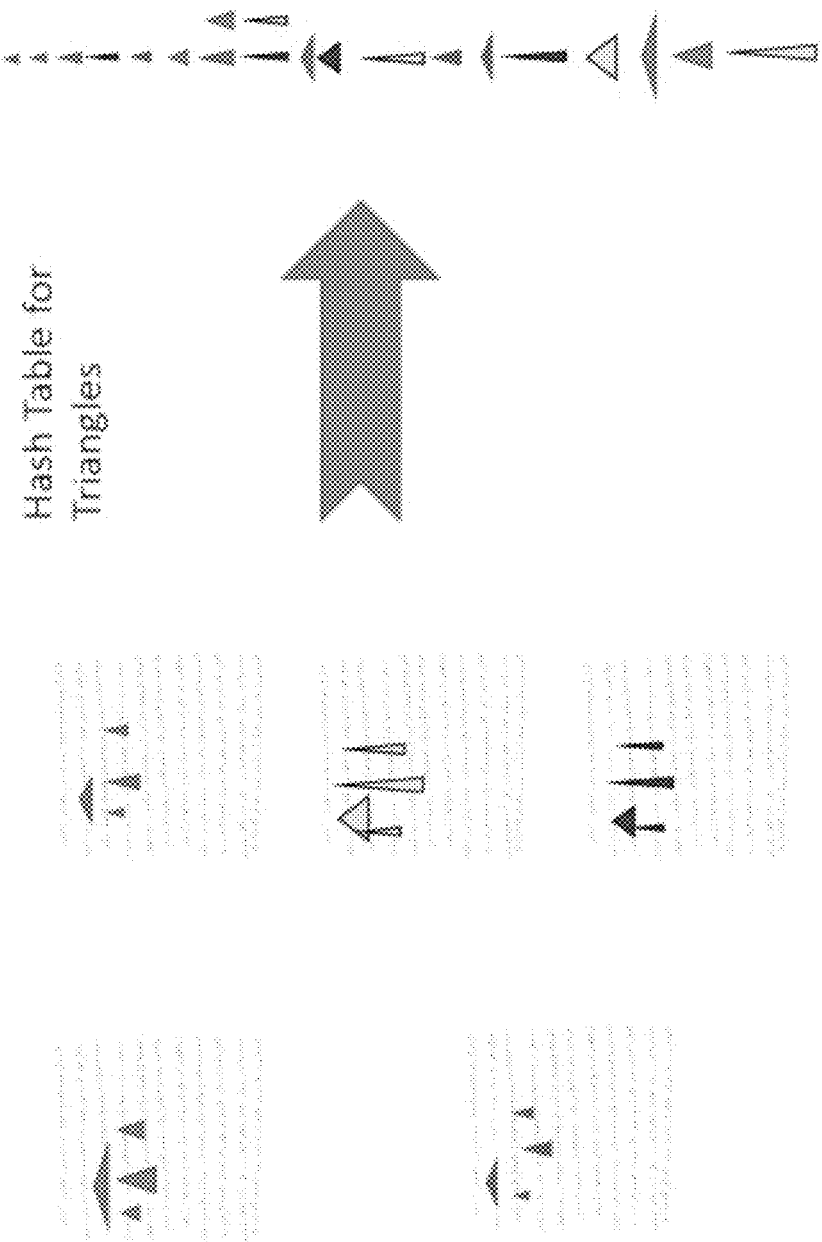
FIGS. 6A-6D are images illustrating the generation of geometric shapes such as triangles from images and associated features that may be arranged within a table for comparison with other images.
Figure 6B:
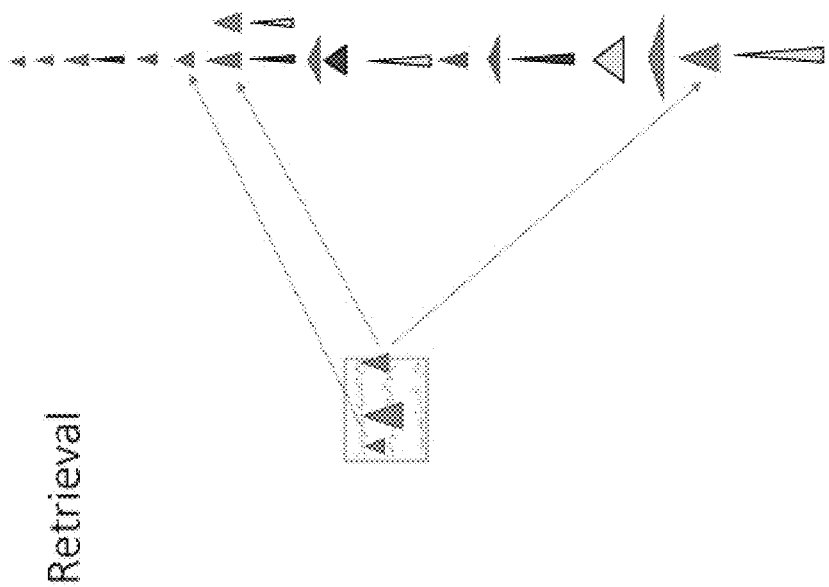
Figure 6C:
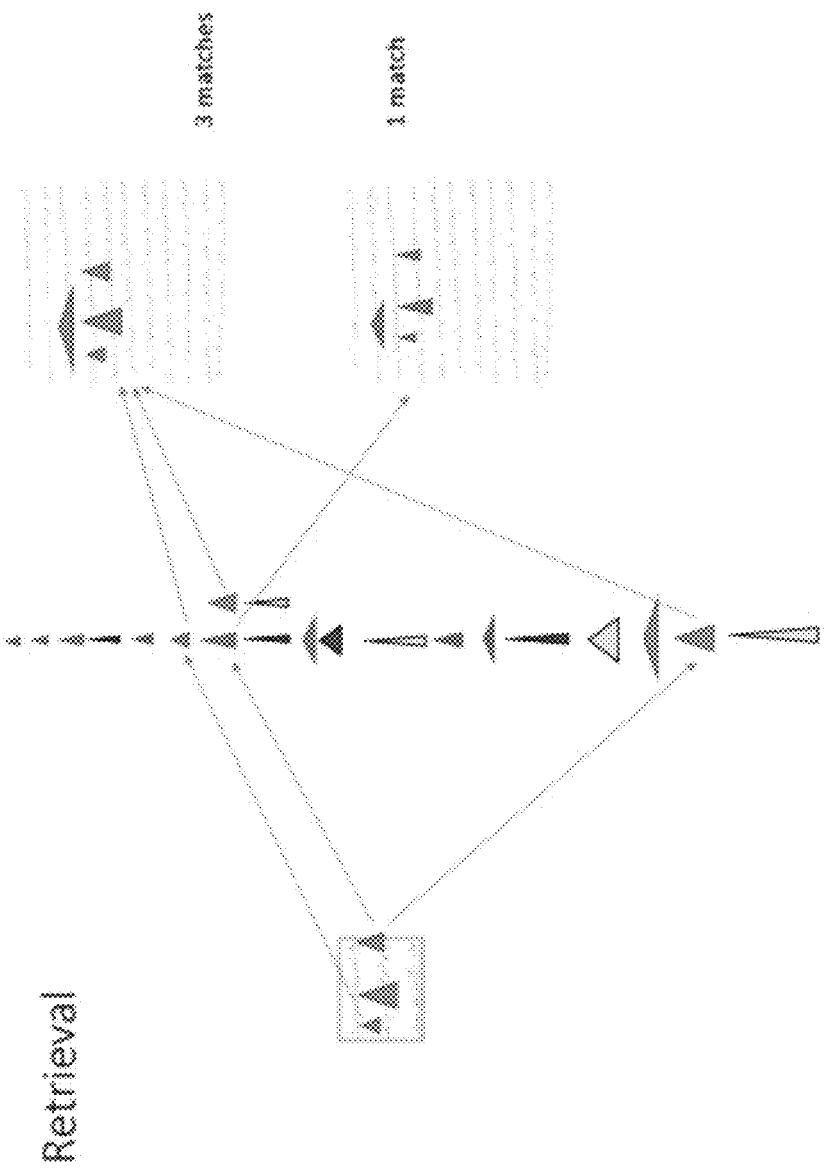
Figure 6D:
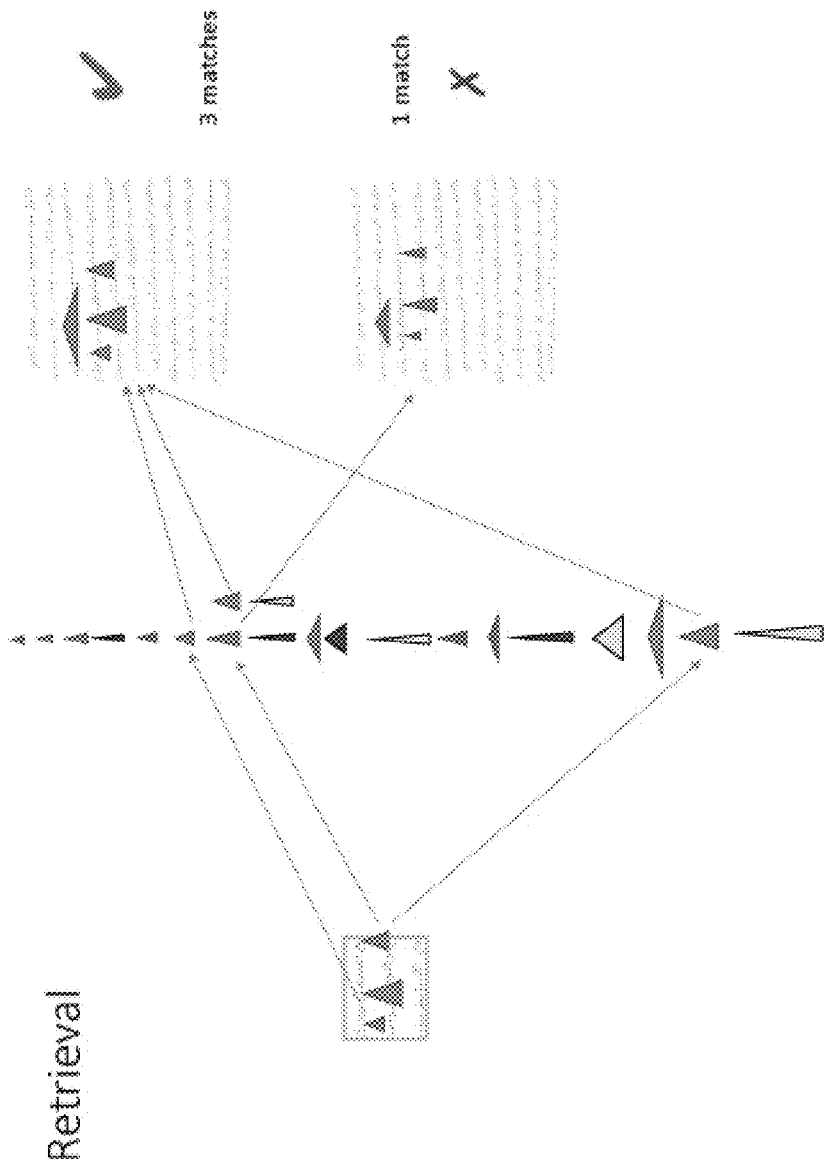
Figure 7:
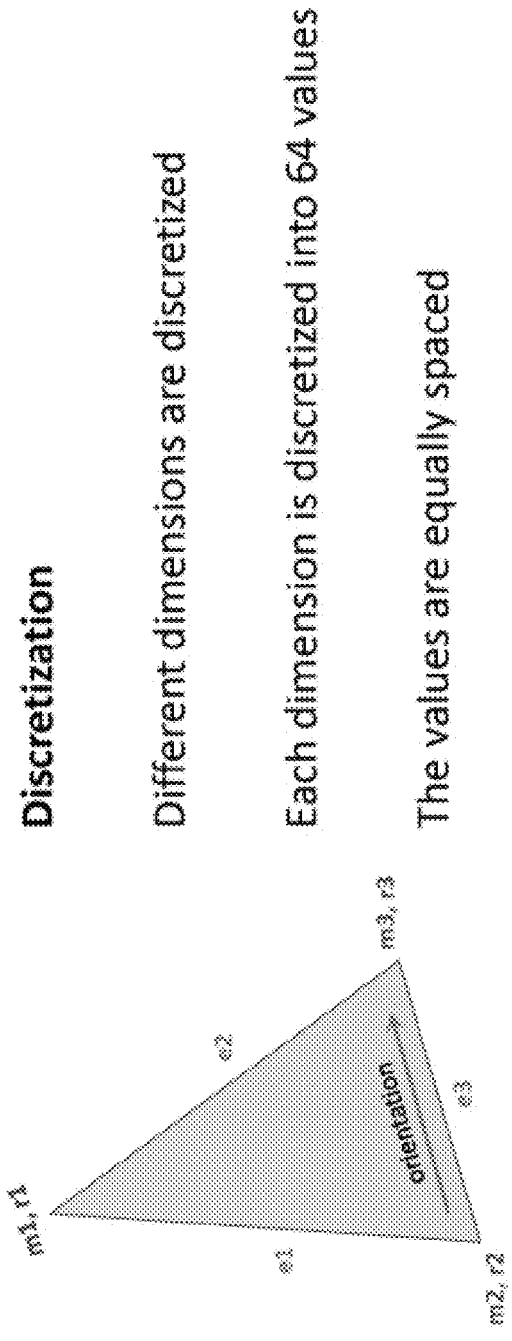
FIG. 7 is an image illustrating a step for discretizing triangles generated or otherwise derived from image data as described herein.
Figure 8:
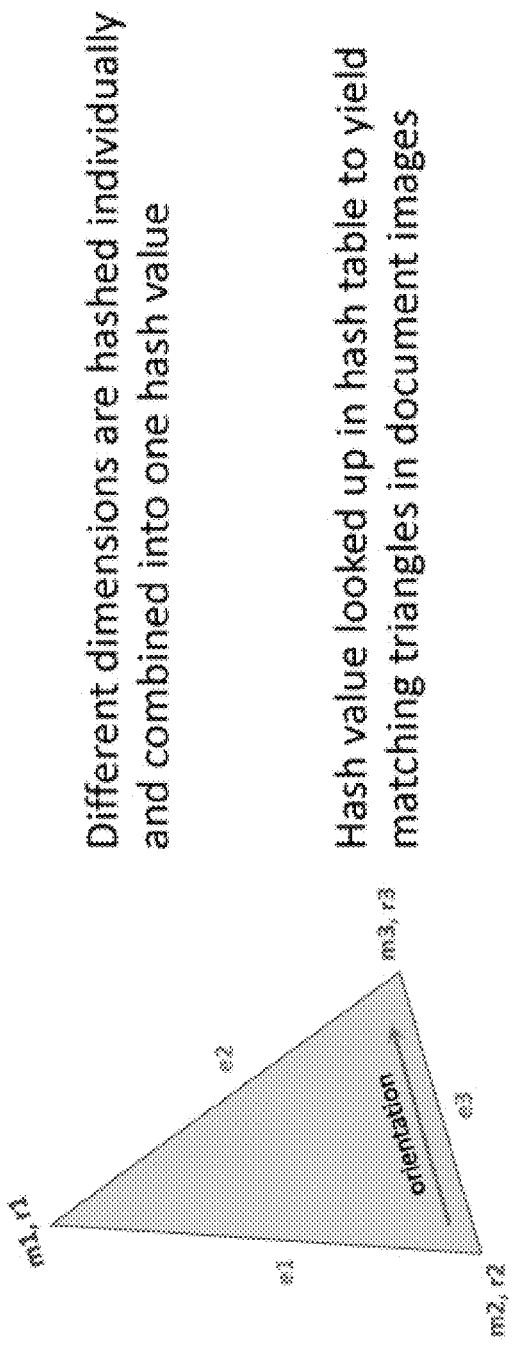
FIG. 8 is an image illustrating a step for hashing triangles generated or otherwise derived from image data.

In one particular embodiment (FIG. 3), a triangle is represented with 10 attributes corresponding to:

1. 3 centroids: 2 attributes each, one for mass and one for average radius
2. 3 edges: one length attribute each; and
3. 1 orientation attribute between two vertices (the $2^{nd}$ and $3^{rd}$ vertex for example).

Referring to block 210 and FIGS. 7, 8, and 9A-9C, in order to be able to hash a triangle into a value, the attributes in each dimension can be discretized. In one embodiment, the attributes are discretized so that values are evenly spaced in each discrete range and each triangle can be represented with an 8-byte number. These numbers are hashed into a hash table with pointers to the triangles that they represent. Discretization can result in the loss of some matches that lie at discretization boundaries. In practice, the inventors did not find the loss to be significant. To reduce the loss, the present method can compensate by using secondary and tertiary distorted hash functions.

Matching Triangles for Image Retrieval

Referring to block 212, in some embodiments, triangles match if their attributes in each dimension are within some threshold of each other. The value of the threshold can be fixed or dependent on the image database and the particular setting. The thresholds used for comparing various attributes need not be the same. Instead of matching attributes directly, the present system hashes the triangle attributes into one hash value and compare triangle hash values. This is further discussed under image retrieval.

In some embodiments, image retrieval may be achieved by finding for each rare triangle in the view the corresponding triangles in the hash table that match the given rare triangles and keeping a count of the number of such matches for each cell. The cells with the highest number of matches would correspond to candidate image matches. For such candidates, another step to further confirm the match can be optionally executed.

In one embodiment, the matching for a given triangle in the view image starts by identifying all the triangles that are potential matches, i.e. triangles that have the same hash value as the given triangle. We can further check, for each potential match, if the match is real by checking the attributes of the view triangle against the attributes of the potential matching triangles. In practice, this additional check was not needed, but it can be useful in some settings. For each triangle that is a match, we increment the number of matches for the cell from which it originates.

Additional related features are contemplated. In some embodiments, the computation time is sublinear in a number of documents, and linear in the number of triangles per view. In general, hashing may involve transforming a set of 10-dimensional triangle attributes into a 1-dimensional value. In this manner, each rare triangle described herein (defined from a target image and candidate image) may be hashed to a value which is 1-dimensional and no longer than 8 bytes. Different dimensions of the triangles may be hashed individually and combined into one hash value. Hash values may be analyzed by performing a look up in a hash table to yield matching triangles in document images.

Figure 9A:
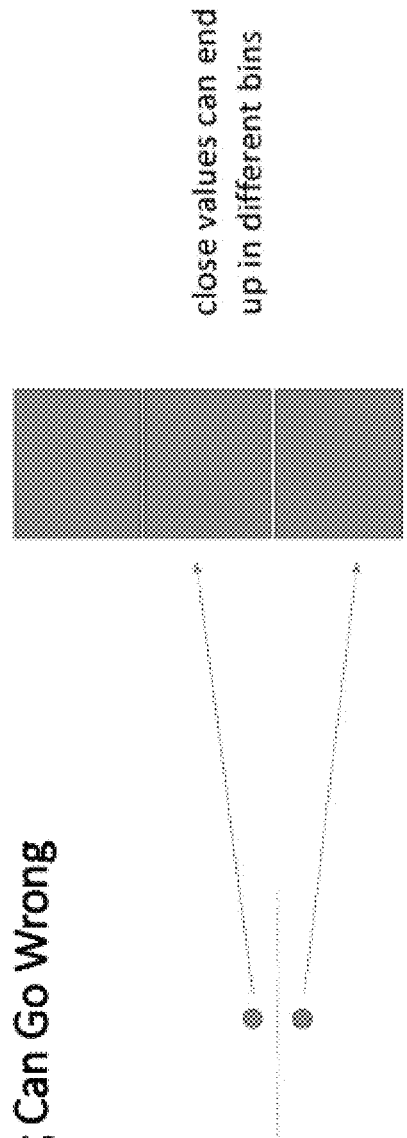
FIGS. 9A-9C are images illustrating aspects of the hashing step described herein.
Figure 9B:
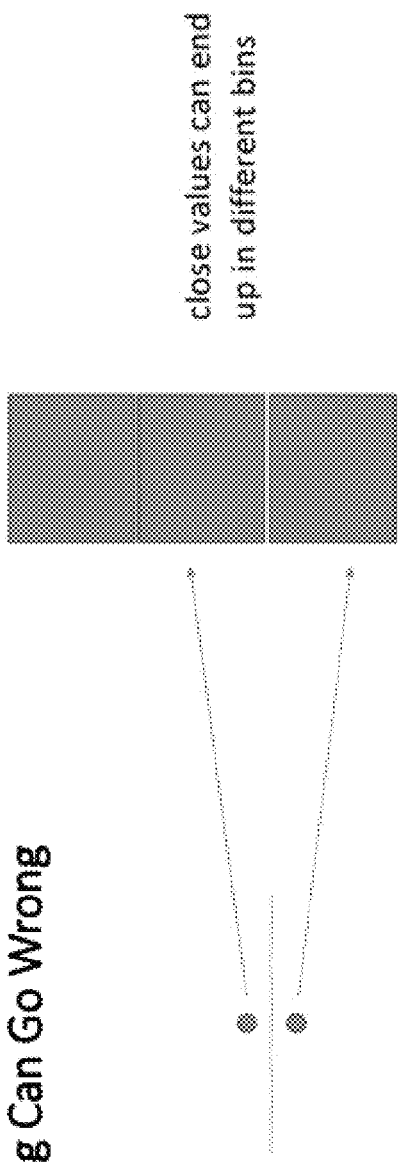
Figure 9C:
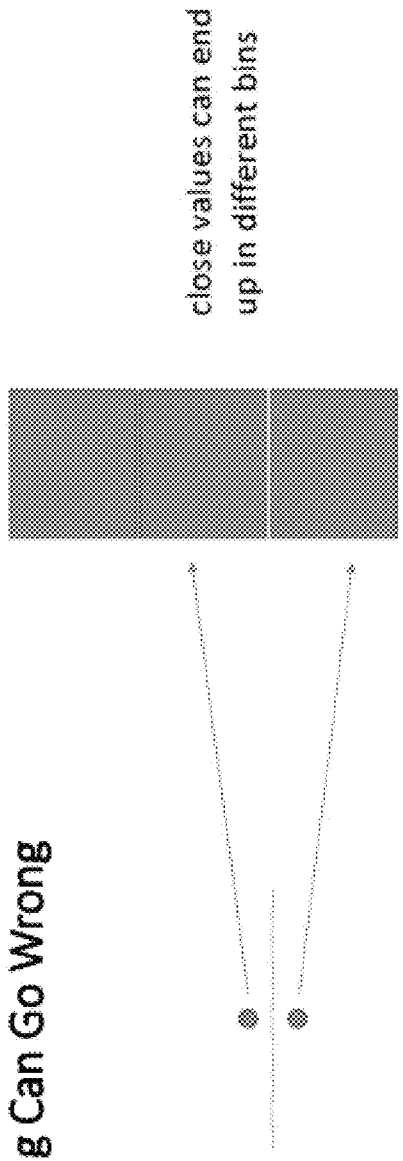

Referencing FIGS. 9A-9C, in one embodiment, it is considered that if several hashes are computed using similar but slightly distorted discretization, odds are higher that at least one of these hashes will not have the issues illustrated. This is affordable because computing has values is efficient and can be executed only for triangles within a predefined view (certain cell of a grid). It was discovered that 4% of views (cells of a grid) fail because they do not include matching triangles. In some embodiments, it was further discovered to apply a secondary hash function (distorted from first) or a tertiary has function until matches are identified, which resulted in improved accuracy.

Exemplary Computing Device

Figure 10:
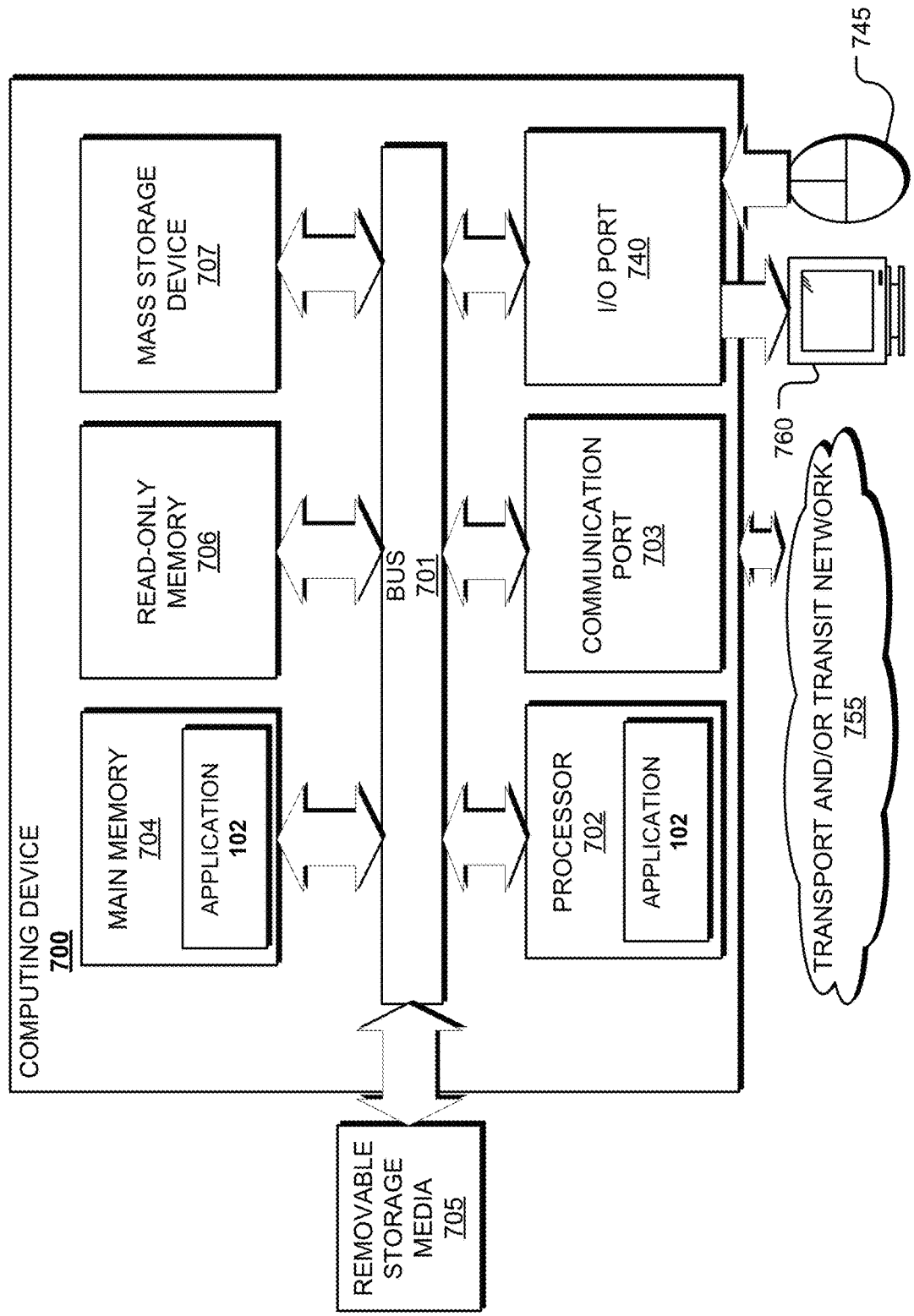
FIG. 10 is an example schematic diagram of a computing device that may implement various methodologies of the image matching and retrieval process, according to aspects of the present disclosure.

FIG. 10 is an example schematic diagram of a computing device 700 that may implement various methodologies discussed herein. For example, the computing device 700 may comprise the computing device 104 executing or accessing functionality and/or aspects of the application 102, or otherwise configured to apply the image matching functionality described herein. The computing device 700 includes a bus 701 (i.e., interconnect), at least one processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computer device 700 connects. Computing device may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc—Read Only Memory (CD-ROM), Compact Disc—Re-Writable (CD-RW), Digital Video Disk—Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 may be encoded with the application 102 that supports functionality discussed above. In other words, aspects of the application 102 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret, or otherwise perform processes, such as through logic instructions, executing on the processor 702 and based on the application 102 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Certain embodiments may be described herein as including one or more modules or services, such as the components of the application 102. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" or "module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

What is claimed is:

1. A method performed by a processor for image matching and retrieval, comprising:
   accessing a plurality of images including a first image defining a target image and at least one secondary image for comparison with the first image;
   defining, by a processor, each of the plurality of images into a plurality of regions;
   transforming, by the processor, the plurality of regions into a plurality of point descriptors, each of the plurality of point descriptors defining a point associated with a region of the plurality of regions and a feature associated with the region;
   generating geometric shapes from a predetermined set of the plurality of point descriptors by generating lines between points of the predetermined set of the plurality of point descriptors such that the lines define edges of the geometric shapes and the points define vertices of the geometric shapes;
   discretize dimensions of the geometric shapes into a set of hash values of a table; and
   identify a predetermined set of attributes common to both a hash value associated with the first image and a hash value associated with the at least one secondary image,
   wherein the plurality of regions defines cells of a grid defined along each of the plurality of images, each of the cells of the grid including predefined dimensions defined along each image such that the plurality of regions correspond to partial views of the plurality of images, and
   wherein the predetermined set of the plurality of point descriptors used to generate the geometric shapes relate to predetermined cells of the grid representing the partial views of the plurality of images.

2. The method of claim 1, wherein the geometric shapes include triangles with three of the plurality of point descriptors and corresponding edges.

3. The method of claim 1, further comprising:
   generating the geometric shapes, by the processor, by:
   selecting a first vertex from the plurality of point descriptors; and
   selecting a second and third vertex from the plurality of point descriptors that are nearest neighbors of the first vertex.

4. The method of claim 1, further comprising discretizing the dimensions of the geometric shapes by the processor, such that values associated with the dimensions are evenly spaced in each discrete range and representing each of the geometric shapes with an 8-byte hash number value.

5. The method of claim 4, further comprising, by the processor, discretizing each of the geometric shapes as unique hash values into a hash table with pointers to the geometric shapes each of the unique hash values represents.

6. The method of claim 1, further comprising:
   identifying, by the processor, a match between the first image and the at least one secondary image where a first hash value defining a first triangle associated with the first image is within some predetermined threshold relative to a second hash value defining a second triangle associated with the at least one secondary image.

7. The method of claim 1, further comprising selecting the plurality of regions at random, the plurality of regions defining cells and each of the cells defining a size based on an expected size of a partial image view.

* * * * *